US012610382B2

(12) United States Patent
Huttunen et al.

(10) Patent No.: US 12,610,382 B2
(45) Date of Patent: Apr. 21, 2026

(54) WIRELESS RESOURCE ALLOCATION

(71) Applicant: NOKIA TECHNOLOGIES OY, Espoo (FI)

(72) Inventors: Janne Matti Juhani Huttunen, Espoo (FI); Dani Johannes Korpi, Helsinki (FI); Mikko Johannes Honkala, Espoo (FI); Mikko Aleksi Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 321 days.

(21) Appl. No.: 18/355,371

(22) Filed: Jul. 19, 2023

(65) Prior Publication Data

US 2024/0073933 A1     Feb. 29, 2024

(30) Foreign Application Priority Data

Aug. 23, 2022     (FI) ..................................... 20225742

(51) Int. Cl.
| | |
|---|---|
| *H04L 5/00* | (2006.01) |
| *H04W 72/04* | (2023.01) |
| *H04W 72/40* | (2023.01) |

(52) U.S. Cl.
CPC ........... *H04W 72/40* (2023.01); *H04L 5/0094* (2013.01); *H04W 72/04* (2013.01)

(58) Field of Classification Search
CPC .... H04W 72/40; H04W 72/04; H04L 5/0094; H04L 5/0037; H04L 5/0039; H04L 5/0048; H04L 5/0007; G06N 20/00
See application file for complete search history.

(56) References Cited

U.S. PATENT DOCUMENTS

| | | |
|---|---|---|
| 2019/0082441 A1 | 3/2019 | Liu et al. |
| 2020/0154429 A1 | 5/2020 | Fang et al. |
| 2020/0367252 A1 | 11/2020 | Hebron et al. |
| 2022/0183015 A1* | 6/2022 | Jang ..................... H04L 5/0048 |

OTHER PUBLICATIONS

Extended European Search Report for European Application No. 23192129.7, mailed on Feb. 7, 2024, 11 pages.

(Continued)

*Primary Examiner* — Christopher M Brandt

(74) *Attorney, Agent, or Firm* — Barta Jones, PLLC

(57)     ABSTRACT

According to an example aspect of the present invention, there is provided an apparatus comprising at least one processing core and at least one memory storing instructions that, when executed by the at least one processing core, cause the apparatus at least to transmit in uplink or sidelink, or receive in downlink, using orthogonal frequency-division multiplexing, via a physical shared channel in a system comprising resource block groups, each resource block group comprising two or more resource blocks, each resource block comprising plural subcarriers which are consecutive to each other in frequency, and process an allocation of resources for the physical shared channel, the allocation received from a network node, the allocation defining that the apparatus may use a part of, but not all, subcarriers of each one of one or more resource blocks for communication via the physical shared channel.

4 Claims, 5 Drawing Sheets

Transmitting, from an apparatus, using OFDM, on a physical uplink shared channel in a system comprising resource block groups, each resource block group comprising two or more resource blocks, each resource block comprising plural subcarriers which are consecutive to each other in frequency

510

Processing an allocation of resources for the physical shared uplink channel, the allocation received from a network, the allocation defining that the apparatus may use a part of, but not all, subcarriers of one or more resource blocks for transmission on the physical uplink shared channel

520

(56) References Cited

OTHER PUBLICATIONS

J. Pihlajasalo et al.; "Deep Learning Based OFDM Physical-Layer Receiver for Extreme Mobility"; IEEE 2021 55th Asilomar Conference on Signals, Systems, and Computers; Pacific Grove, CA, USA; Oct. 31, 2021; pp. 395-399.

Office Action and Search Report for Finnish U.S. Appl. No. 20/225,742, mailed on Jan. 26, 2023, 9 pages.

Yaacoub et al., "A Survey on Uplink Resource Allocation in OFDMA Wireless Networks", IEEE Communications Surveys & Tutorials; vol. 14, No. 2, Second Quarter 2012; May 27, 2011; pp. 322-337.

Honkala et al.; "DeepRx: Fully Convolutional Deep Learning Receiver"; IEEE Transactions on Wireless Communications; vol. 20, No. 6; Jan. 12, 2021; 32 pages.

Korpi et al.; "DeepRx MIMO: Convolutional MIMO Detection with Learned Multiplicative Transformations"; ICC 2021—IEEE International Conference on Communications (ICC); Jun. 14, 2021; 6 pages.

* cited by examiner

120

130

140

110A    110B    110C    110D

170

160

150

SC

Symb

FIGURE 2

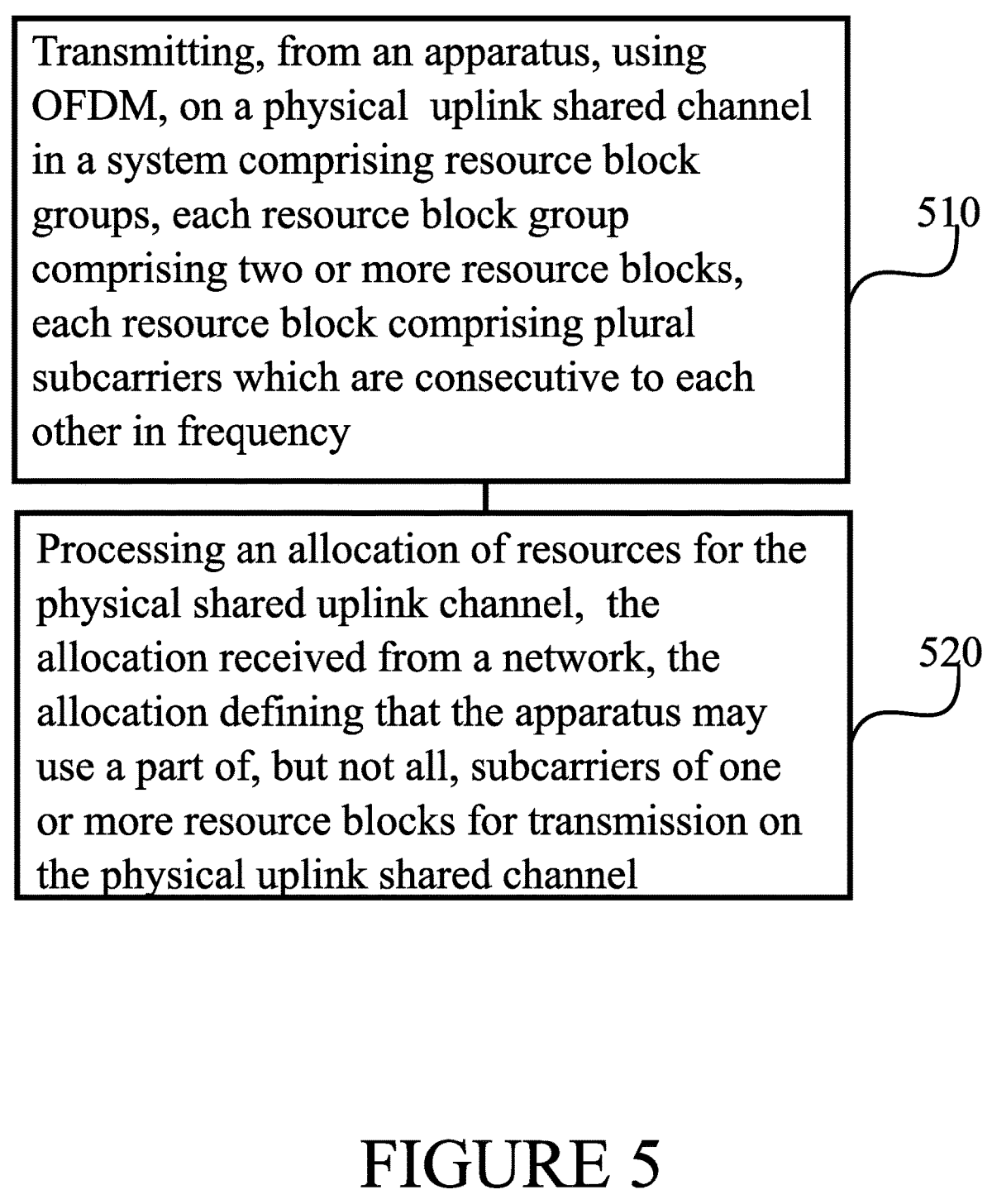

Transmitting, from an apparatus, using OFDM, on a physical uplink shared channel in a system comprising resource block groups, each resource block group comprising two or more resource blocks, each resource block comprising plural subcarriers which are consecutive to each other in frequency — 510

Processing an allocation of resources for the physical shared uplink channel, the allocation received from a network, the allocation defining that the apparatus may use a part of, but not all, subcarriers of one or more resource blocks for transmission on the physical uplink shared channel — 520

FIGURE 5

WIRELESS RESOURCE ALLOCATION

PRIORITY

This application claims priority to Finnish Application No. 20225742, filed on Aug. 23, 2022, entitled "WIRELESS RESOURCE ALLOCATION", the entirety of which is hereby incorporated by reference.

FIELD

The present disclosure relates to allocation of resources in a wireless communication system.

BACKGROUND

User equipments, UEs, seeking to transmit in the uplink direction towards a base station, for example using a physical shared channel which is used also by other UEs, may be allocated specific transmission resources to enable co-use of the overall resources of the physical channel, which may be the overall radio interface, or a specific shared physical channel. The resources may take the form of time, frequency or code resources, or combinations of these.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to transmit in uplink or sidelink, or receive in downlink, using orthogonal frequency-division multiplexing, via a physical shared channel in a system comprising resource block groups, each resource block group comprising two or more resource blocks, each resource block comprising plural subcarriers which are consecutive to each other in frequency, and process an allocation of resources for the physical shared channel, the allocation received from a network node, the allocation defining that the apparatus may use a part of, but not all, subcarriers of each one of one or more resource blocks for communication via the physical shared channel.

According to a second aspect of the present disclosure, there is provided an apparatus comprising at least one processing core and at least one memory storing instructions that, when executed by the at least one processing core, cause the apparatus at least to receive in uplink, or transmit in downlink, using orthogonal frequency-division multiplexing, via a physical shared channel in a system comprising resource block groups, each resource block group comprising two or more resource blocks, each resource block comprising plural subcarriers which are consecutive to each other in frequency, and provide to a one user equipment an allocation of resources for the physical shared channel, the allocation defining that the user equipment may use a part of, but not all, subcarriers of each one of one or more resource blocks for transmission or reception via the physical shared channel.

According to a third aspect of the present disclosure, there is provided a method comprising transmitting in uplink or sidelink, or receiving in downlink, from an apparatus, using orthogonal frequency-division multiplexing, via a physical shared channel in a system comprising resource block groups, each resource block group comprising two or more resource blocks, each resource block comprising plural subcarriers which are consecutive to each other in frequency, and processing an allocation of resources for the physical shared channel, the allocation received from a network node, the allocation defining that the apparatus may use a part of, but not all, subcarriers of each one of one or more resource blocks for communication via the physical shared channel.

According to a fourth aspect of the present disclosure, there is provided a method, comprising receiving in uplink, or transmitting in downlink, using orthogonal frequency-division multiplexing, via a physical shared channel in a system comprising resource block groups, each resource block group comprising two or more resource blocks, each resource block comprising plural subcarriers which are consecutive to each other in frequency, and providing to a one user equipment an allocation of resources for the physical shared channel, the allocation defining that the user equipment may use a part of, but not all, subcarriers of each one of one or more resource blocks for transmission or reception via the physical shared channel.

According to a fifth aspect of the present disclosure, there is provided an apparatus comprising means for transmitting in uplink or sidelink, or receiving in downlink, using orthogonal frequency-division multiplexing, via a physical shared channel in a system comprising resource block groups, each resource block group comprising two or more resource blocks, each resource block comprising plural subcarriers which are consecutive to each other in frequency, and processing an allocation of resources for the physical shared channel, the allocation received from a network node, the allocation defining that the apparatus may use a part of, but not all, subcarriers of each one of one or more resource blocks for communication via the physical shared channel.

According to a sixth aspect of the present disclosure, there is provided an apparatus comprising means for receiving in uplink, or transmitting in downlink, using orthogonal frequency-division multiplexing, via a physical shared channel in a system comprising resource block groups, each resource block group comprising two or more resource blocks, each resource block comprising plural subcarriers which are consecutive to each other in frequency, and providing to a one user equipment an allocation of resources for the physical shared channel, the allocation defining that the user equipment may use a part of, but not all, subcarriers of each one of one or more resource blocks for transmission or reception via the physical shared channel.

According to a seventh aspect of the present disclosure, there is provided a non-transitory computer readable medium having stored thereon a set of computer readable instructions that, when executed by at least one processor, cause an apparatus to at least transmit in uplink or sidelink, or receive in downlink, using orthogonal frequency-division multiplexing, via a physical shared channel in a system comprising resource block groups, each resource block group comprising two or more resource blocks, each resource block comprising plural subcarriers which are consecutive to each other in frequency, and process an allocation of resources for the physical shared channel, the allocation received from a network node, the allocation defining that the apparatus may use a part of, but not all, subcarriers of each one of one or more resource blocks for communication via the physical shared channel.

According to an eighth aspect of the present disclosure, there is provided a non-transitory computer readable medium having stored thereon a set of computer readable instructions that, when executed by at least one processor, cause an apparatus to at least receive in uplink, or transmit in downlink, using orthogonal frequency-division multiplexing, via a physical shared channel in a system comprising resource block groups, each resource block group comprising two or more resource blocks, each resource block comprising plural subcarriers which are consecutive to each other in frequency, and provide to a one user equipment an allocation of resources for the physical shared channel, the allocation defining that the user equipment may use a part of, but not all, subcarriers of each one of one or more resource blocks for transmission or reception via the physical shared channel.

According to a ninth aspect of the present disclosure, there is provided a set of computer-readable instructions which, when executed, cause a computer to perform a method according to the third or fourth aspect.

BRIEF DESCRIPTION OF THE DRAWINGS

FIG. 2 illustrates an example resource allocation in accordance with at least some embodiments of the present invention;

FIG. 5 is a flow graph of a method in accordance with at least some embodiments of the present invention.

EMBODIMENTS

Disclosed herein are ways to perform resource allocation in wireless communication systems, such as cellular systems. In detail, methods are disclosed which enable allocation of resources for an uplink shared channel in such a manner, that data symbols may be transmitted toward the network, using the allocated resources, often enough to facilitate data-aided detection of the transmission at the network end. When data-aided detection is used, a technical benefit is obtained in that fewer, or no, reference or pilot symbols need to be transmitted, leading to enhanced spectral efficiency since data symbols may be transmitted instead of the reference or pilot symbols. In data-aided detection, the receiver may extract information characterizing the radio channel between the transmitter and the receiver from data symbols. Machine learning methods may be used in data-aided detection.

Figure 1A:
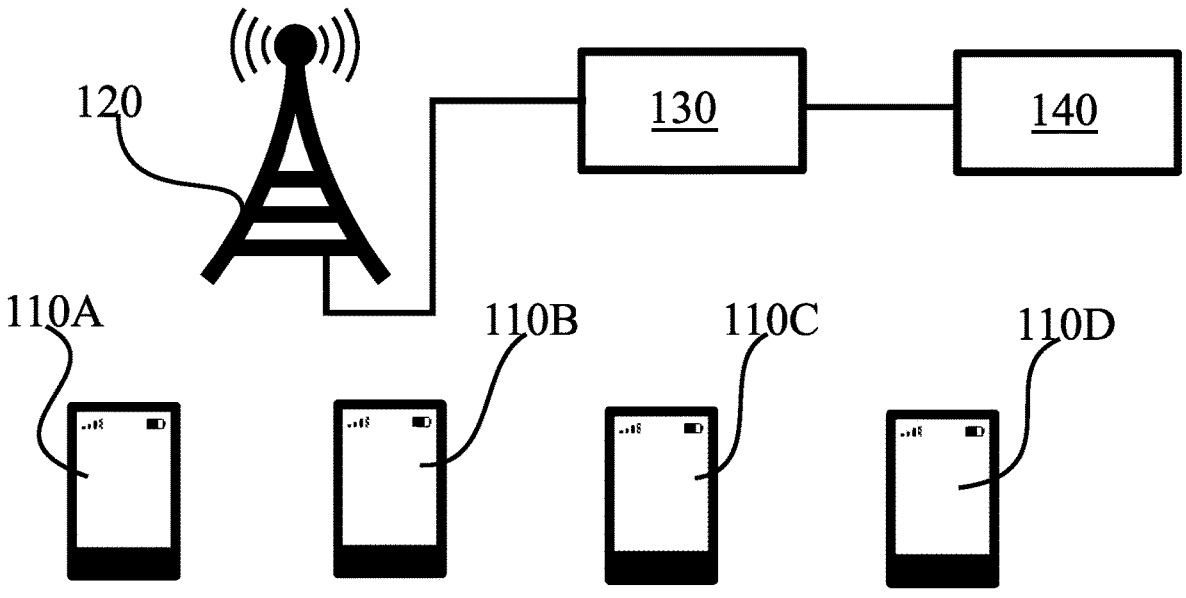
FIG. 1A illustrates an example system in accordance with at least some embodiments of the present invention.

FIG. 1A illustrates an example system in accordance with at least some embodiments of the present invention. User equipments 110A, 110B, 110C and 110D are attached in a cell controlled by base station 120. A user equipment may comprise, for example, a smartphone, a mobile phone, a connected car connectivity module, a smart utility meter, an Internet of Things node or a connected sensor node such as a closed-circuit television camera, for example. Base station 120 may be referred to as an eNB or gNB, for example, depending on the used radio access technology. In general base stations are radio access nodes connecting over a radio interface to user equipments and, usually but not always, via a wired interface, directly or indirectly, with a core network node 130. Core network node 130 may be connected to gateway 140, which may like core network node 130 be comprised in a core network of the communication system. In general, a core network node may be tasked with functions which affect the system as a whole, such as managing switching of calls and providing subscriber registers. A cellular communication system may comprise dozens, hundreds or even thousands of base stations. Cellular communication systems may be configured to interoperate with each other to enable subscriber roaming from a coverage area of one cellular system to a coverage area of another cellular system.

Communication from base station 120 to user equipment(s) 110A, 110B, 110C, 110D is termed the downlink direction, and communication from the user equipment(s) 110A, 110B, 110C and 110D to base station 120 is termed the uplink direction. Communication in the uplink may be performed using a dedicated channel or a shared channel, wherein a shared channel may be shared between more than one user equipment. When a shared channel is used, resources that constitute the physical channel need to be shared between the user equipments, such that no two user equipments use the same resources at the same time. Base station 120 may be configured to provide resource allocations to user equipments desiring to use a shared uplink channel, such as a physical shared uplink channel, to enable such sharing which avoids situations where two user equipments would try to use the exact same resource, such as channel, at the same time.

Figure 1B:
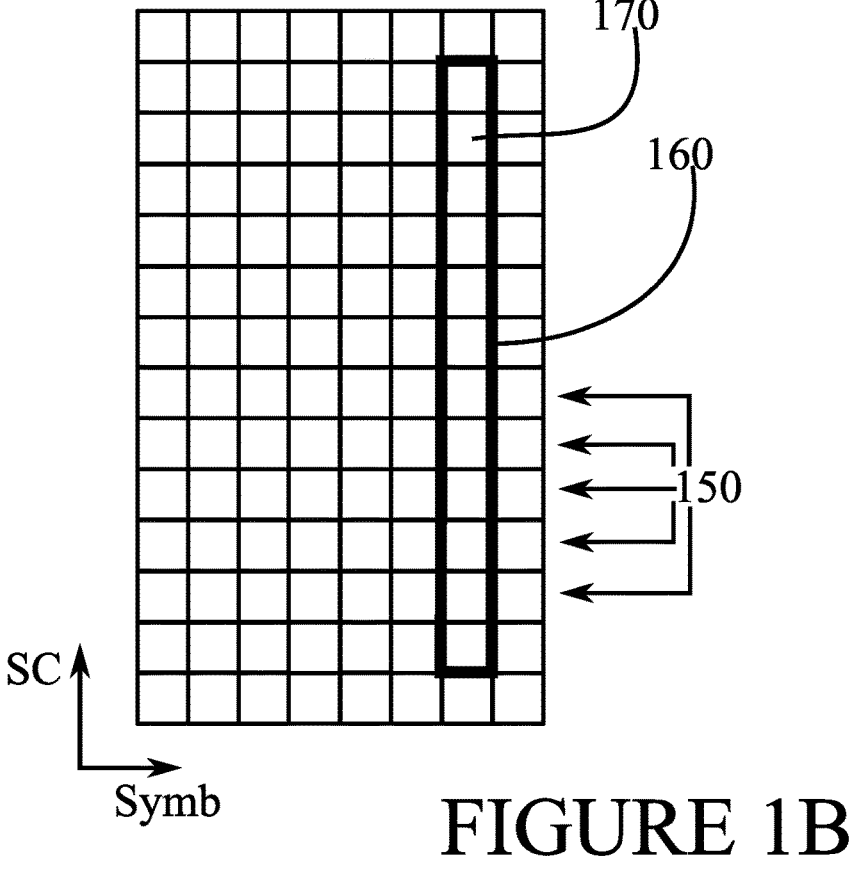
FIG. 1B illustrates an example of communication resources in accordance with at least some embodiments of the present invention.

FIG. 1B illustrates an example of communication resources in accordance with at least some embodiments of the present invention. The resources are of an orthogonal frequency-division multiple access, OFDM, system. Examples of OFDM technologies are long term evolution LTE, and fifth generation, 5G, which is also known as new radio, NR, both specified by the $3^{rd}$ generation partnership project, 3GPP. On the vertical axis are subcarriers SC, while the horizontal axis corresponds to symbols Symb. In other words, the vertical axis is a frequency axis and the horizontal axis is a time axis. Symbols are grouped into slots, slots are grouped into subframes and subframes are grouped into radio frames. For example, in 5G, a subframe is one millisecond long and a radio frame consists of ten subframes. In 5G, the number of symbols per slot, and slots per subframe, may be varied.

In the frequency direction, there are plural subcarriers 150, which are consecutive to each other in the frequency domain, meaning that they form a continuous sequence of subcarriers in the frequency domain with each subcarrier being adjacent to another subcarrier, and not an empty band, except the first one and the last one, which are adjacent to only one subcarrier. A set of subcarriers 150 forms a resource block 160. In 5G, a resource block has 12 subcarriers 150. In general, the resources may comprise resource block groups, RBGs each RBG comprising two or more resource blocks 160, each resource block comprising plural subcarriers which are consecutive to each other in frequency. The subcarriers being consecutive in the frequency domain is an element of OFDM communication to facilitate detection of symbols encoded on the subcarriers using fast Fourier transform algorithms. A resource element 170 comprises a single symbol on a single subcarrier 150.

Resources for physical uplink shared channels may be allocated in several different ways, such as by using a downlink control information, DCI, message transmitted to the UE by base station 120. Firstly, RBGs may be allocated to user equipments, UEs, using a bit sequence. Each UE may determine from the bit sequence which RBGs it may use, this allocation therefore having the granularity of a single RBG. As a second alternative, one or more consecutive resource block, RB, 160 is allocated to a single UE. For example, parameters RB_Start and Number of Consecutive RBs may be communicated to the UE to inform it of the resource blocks it may use. Thirdly, one or more interlaces of RBs may be allocated to a UE, such that the allocated RBs recur in a fixed and repeating pattern interlaced with patterns allocated to other UEs.

A shortcoming of the three resource allocation mechanisms described above is that scheduled data is sent with a coarse granularity. This is particularly true when desiring to use data-aided detection of the data transmitted in the uplink. Data-aided receivers can perform efficient detection. In particular, machine learning, ML, based data-aided receivers can extract useful channel information from data symbols, allowing for a reduction or removal of pilot or reference symbols, such as sounding reference signals, SRS, in time division duplex systems and releasing also those resource elements for transmission of data. Interleaving UEs on a per-RB granularity leads to the data symbols being too scattered in time and/or the frequency domain for a data-aided receiver to properly utilize the data symbols for channel estimation. To fully harness the power of data-aided reception among several UEs, the interleaving of allocated data symbols needs to be finer, such that the gaps between data symbols of an individual UE are substantially reduced. Moreover, if considering a fully pilotless link, this distribution of data symbols must be particularly fine in time and/or frequency. If the allocation also covers a larger part of the spectrum, it would prove useful in data-aided detection.

The present disclosure described a resource allocation type which has been optimized for data-aided receivers, such as, for example, ML-based data-aided receivers. This is accomplished by facilitating finer granularity of allocated communication resources with, preferably, a low signalling overhead, making it feasible to extract accurate channel information with data-aided receivers. It also covers a larger part of the spectrum for the UEs. One manner of implementing ML-based data-aided detection is based on convolutional neural networks, CNNs, as described in [1] and [2].

In particular, subcarrier-level granularity is enabled in the disclosed resource allocation mechanism. The allocation comprises allocating to a specific UE a part of, but not all, subcarriers of one resource block. This multiple UEs may be allocated subcarriers from the same resource block. An example of a signalling mechanism to communicate such allocations is also disclosed. The signalling may be conveyed to a UE using a DCI message, for example. The resource allocation parameters of different layers may be different, resulting in multi-user multiple-input and multiple output, MU-MIMO, patterns. In other words, different MIMO layers may use different resource allocations in the time (symbol) direction. Different MIMO streams may use different patterns in the time-frequency space.

Figure 2:
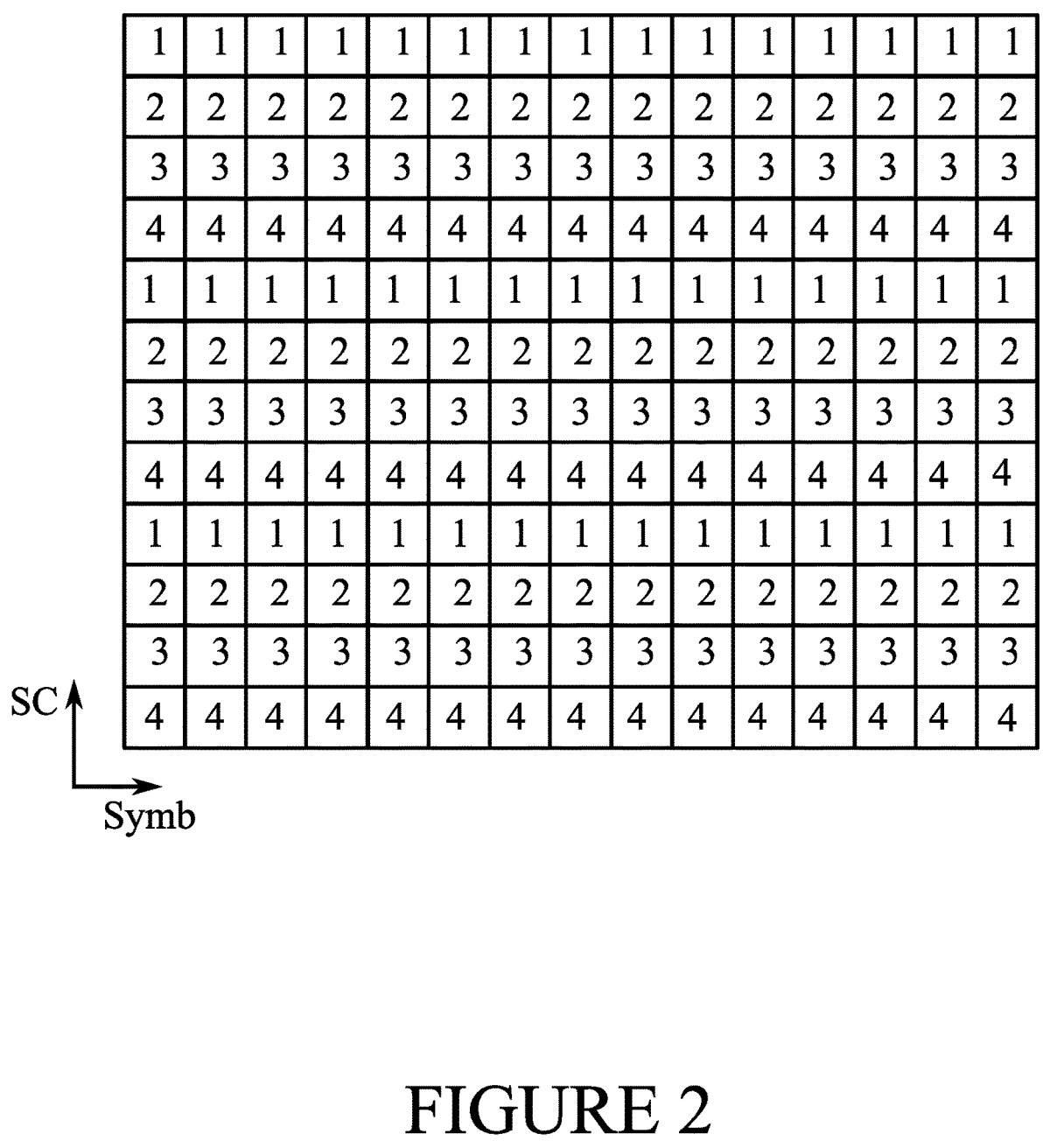

FIG. 2 illustrates an example resource allocation in accordance with at least some embodiments of the present invention. As in FIG. 1B, the vertical axis corresponds to consecutive subcarriers in frequency and the horizontal axis corresponds to symbols in time. FIG. 2 illustrates one resource block, RB, comprising 12 subcarriers, SC, and a number of symbols forming a slot on the horizontal axis, consistent with the 5G technology. However, the number of symbols on the horizontal axis is not important in illuminating the resource allocation concept.

In FIG. 2, the number in each resource element denotes a UE to which the resource element is allocated. UEs 1, 2, 3 and 4 have allocations in this resource block, which means that four UEs have opportunities to transmit during this resource block. This is a clear improvement from the point of view of data-aided detection compared to a situation where an entire resource block is allocated to a single UE. In this case, the four UEs are interleaved into every fourth subcarrier in the frequency direction, while occupying an entire slot in the time direction. The interval between adjacent used subcarriers allocated for a given UE is now small enough to carry out efficient data-aided detection, while the resolution remains the same throughout the whole bandwidth. Interleaving the allocations provides the benefit, that each allocation spans an overall larger part of the spectrum, than the case where e.g. UE 1 would have the three first subcarriers, UE 2 would have the next three, UE 3 the next three and finally UE 4 the last three. This supports data-aided detection.

Processing such received signals with data-aided receivers allows one to obtain accurate channel information over the whole bandwidth using just the sparsely allocated data symbols, rendering pilot or reference symbols, such as SRS, unnecessary. This will improve spectral efficiency and simplify network configuration.

The resource allocation described above may be communicated from base station 120 to the UEs using, for example, the following variables:

RB_start: identifies a first RB in which resources for the UE are contained.

RB_num: defines a number of consecutive RBs in which resources for the UE are contained. The consecutive RBs may be in a specific bandwidth part, BWP, for example.

Offset: The integer subcarrier offset within the RB for the resources of the UE. In the example of FIG. 2, this parameter would be 0 for UE1, 1 for UE2, 2 for UE3 and 3 for UE4. The maximum value of this parameter is 12 in a 5G system where there are 12 subcarriers in each resource block, RB.

Period: defines the periodicity of the resource allocation within a single RB, that is, how often the subcarrier within a single RB is allocated to the specific UE. Referring again to FIG. 2, here the period of each UE is 4 since an allocated subcarrier recurs as every fourth subcarrier for each UE. The value of the period may also determine what is the maximum value of the offset. The same period may be used for all UEs, but in some embodiments the period is different for different co-scheduled UEs.

Time-hop: defines how many subcarriers the allocations are shifted from one OFDM symbol to the next. This makes it possible to cover different subcarriers within the slot, for example in case the channel is more frequency-selective than time-variant. The example of FIG. 2 corresponds to a Time hop value of 0. Essentially, Time hop can be interpreted as a changing offset value from one OFDM symbol to the next, such that the offset values wrap around to 0 once they exceed the maximum allowed value. In other words, symbols of a single slot on a single subcarrier could be allocated to different UEs.

Not all combinations of the Offset and Period parameters are numerically possible. In principle, the range of legal offsets is between 0 and Period−1. Moreover, Period should be an integer factor of the RB size, 12. To illustrate this further, all the legal values are listed in the following table:

| Period | Offset | Notes |
|---|---|---|
| 1 | 0 | Allocation of whole RB to one UE |
| 2 | 0, 1 | Two UEs per RB |
| 3 | 0, 1, 2 | Three UEs per RB |
| 4 | 0, 1, 2, 3 | Four UEs per RB |
| 6 | 0, 1, 2, 3, 4, 5 | Six UEs per RB |
| 12 | 0, 1, 2, 3, 4, 5, 6, 7, 8, 9, 10, 11 | 12 UEs per RB |

The signalling of resource allocations can be accomplished using similar messages as that of prior resource allocation types. In particular, physical uplink shared channel, PUSCH, resources may be scheduled using DCI messages. In a 5G system, DCI messages of formats 0_0 or 0_1 may be used. There, the RB_Start and RB_Num information may be included within a resource indicator value, RIV, field, for example. In addition to this, the proposed scheduling parameters require four extra bits, when considering periods only up to 6. A period of 12 subcarriers may be seen as unlikely, as it is unlikely to result in sufficient data-aided detection performance under many channel conditions. The signalled binary values and the corresponding Period and Offset parameters are shown in the following table:

| Period | Offset | Binary indicator |
|---|---|---|
| 2 | 0 | 0000 |
| 2 | 1 | 0001 |
| 3 | 0 | 0010 |
| 3 | 1 | 0011 |
| 3 | 2 | 0100 |
| 4 | 0 | 0101 |
| 4 | 1 | 0110 |
| 4 | 2 | 0111 |
| 4 | 3 | 1000 |
| 6 | 0 | 1001 |
| 6 | 1 | 1010 |
| 6 | 2 | 1011 |
| 6 | 3 | 1100 |
| 6 | 4 | 1101 |
| 6 | 5 | 1110 |

In addition, to facilitate the same UE to utilize more of the resource elements inside each RB, the network may include an extra field for indicating how many consecutive offsets are allocated for the UE. The number of bits reserved for this depends on the value of the Period parameter, as that defines how many offsets there are available. The number of bits for this field is represented in the table below, which takes into account the fact that at least one Offset is always allocated when transmitting this control message. This field defines the number of consecutive offsets, starting from the primary offset index defined by the first four bits. This means that it is not possible to allocate arbitrary offsets for the UEs, as such allocation patterns can be largely covered by simply using a smaller Period parameter.

| Period | Number of bits for the "consecutive offsets" field |
|---|---|
| 2 | 1 bit |
| 3 | 2 bits |
| 4 | 2 bits |
| 6 | 3 bits |

To provide an example of the number of bits used to communicate the disclosed resource allocation, let us first consider the example scenario of FIG. 2. There, the binary field of UE1 could be 010100, where the first four bits correspond to "Period=4" and "Offset=0", while the last 2 bits denote that only 1 Offset value is allocated for UE1. In a similar fashion, the binary field of UE2 is 011000. Assuming that the last two Offsets would be scheduled for the same UE (that is those allocated for UE3 and UE4 in the example of FIG. 2), the binary field in this case would be 011101. Now, the first four bits indicate "Period=4" and "Offset=3", while the last 2 bits indicate that 2 consecutive offsets are allocated for this UE.

As for demodulation reference signal, DMRS, patterns, they can be spread across the subcarriers according to the Period parameter, similar to the data symbols, without much impact on the detection accuracy. As also shown by the simulation results of FIG. 2B, ML-based receivers, can operate with such sparse DMRS patterns. Therefore, the spreading and allocation of the transmit resource grid based on the Period and Offset parameters can be done independent of the utilized DMRS configuration. A special case of this is a fully pilotless transmission, where no DMRS is used.

Of interest is that larger values of the Period parameter will reduce the effectiveness of discrete Fourier transform, DFT, spreading in reducing the peak-to-average-power ratio, PAPR, of the waveform. Therefore, this should be factored into the coverage and transmit power calculations when using DFT-spread OFDM, DFT-s-OFDM, waveforms in the transmitter.

Overall, the signalling mechanism disclosed herein is only one example of how the allocation of a part of the subcarriers, but not all the subcarriers, of a single RB to one UE may be accomplished. The skilled person will understand that there are many ways to accomplish such signalling. The base station is configured to receive data transmitted in the uplink in accordance with the allocations it sends to the user equipments.

Figure 3:
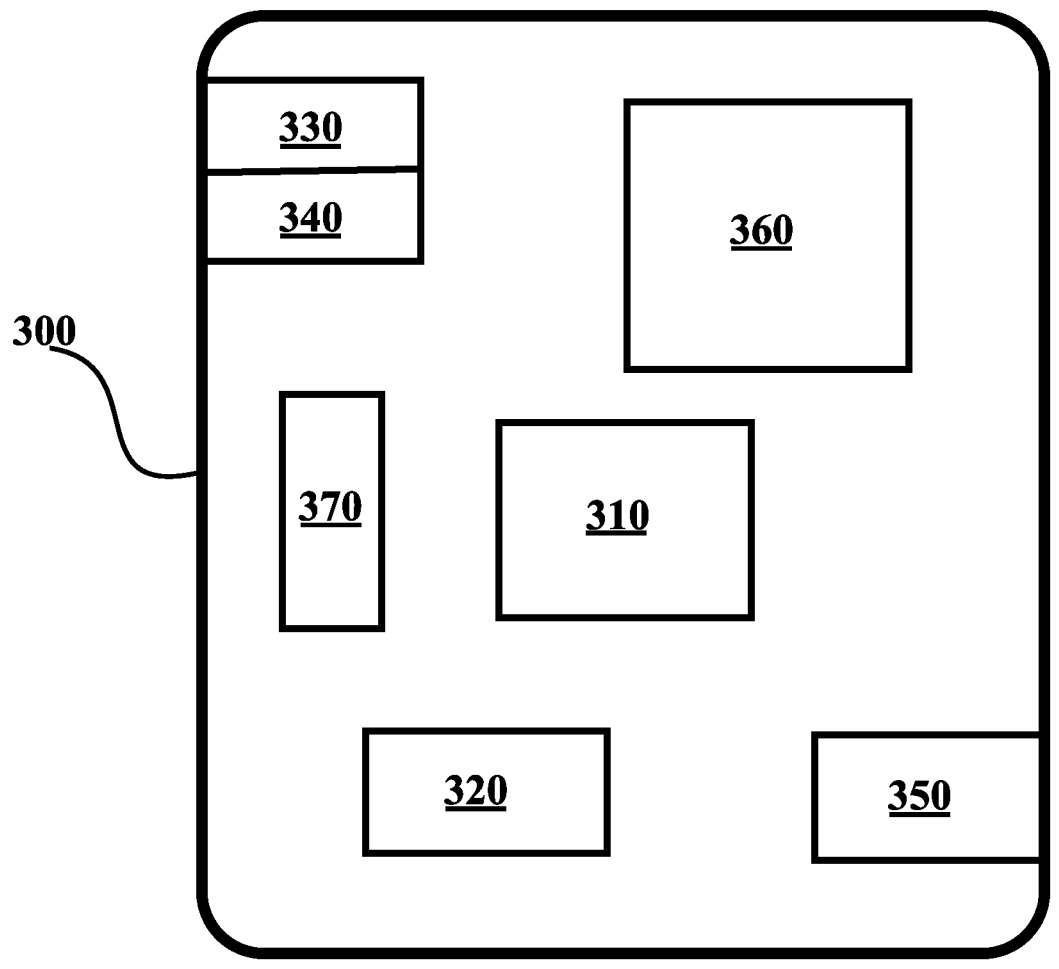
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as a user equipment or, in applicable parts, a base station. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as transmitting, processing, performing, providing and receiving. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a user equipment or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
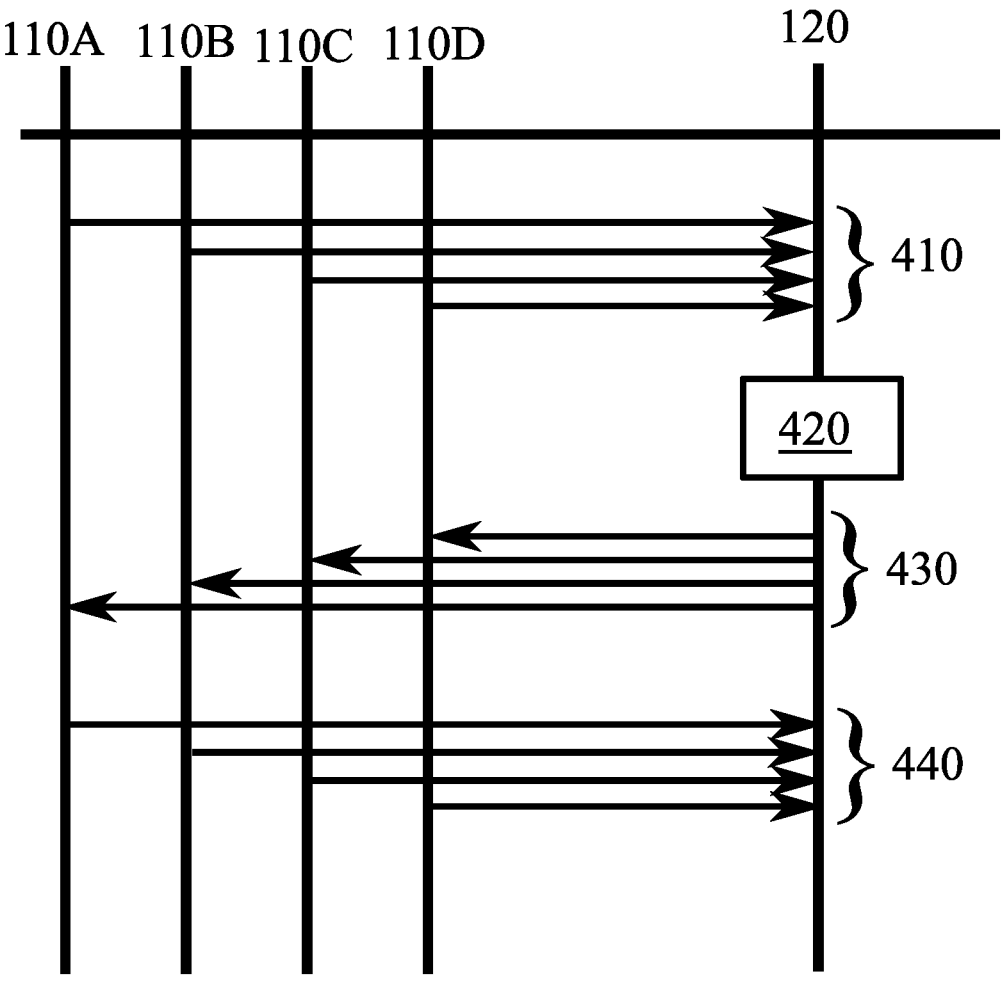
FIG. 4 illustrates signalling in accordance with at least some embodiments of the present invention.

FIG. 4 illustrates signalling in accordance with at least some embodiments of the present invention. On the vertical axes are disposed, on the left, UEs 110A, 110B, 110C and 110D of FIG. 1A, and on the right, base station 120 of FIG. 1A. Time advances from the top toward the bottom.

In phases 410, the UEs indicate to base station 120 their desire to transmit on the PUSCH. These phases need not all occur at the same time, rather, the UEs may join the PUSCH one at a time as time goes on. In phase 420, base station 120 (or a further network node) designs an allocation of resources for the set of four UEs, such that in the allocation more than one UE is allowed to transmit in a single resource block, such that a first part of the subcarriers of the resource block is allocated to UE 110A, a second part of the subcarriers of the resource block is allocated to UE 110B, a third part of the subcarriers of the resource block is allocated to UE 110C and a fourth part of the subcarriers of the resource block is allocated to UE 110D. An example of such an allocation is illustrated in FIG. 2. Four UEs is used here for the sake of illustration, as described above the number of UEs given subcarriers in a given RB may be two, three, four or five, for example.

In phase 430, each UE is informed of its allocation, which was designed in phase 420. Subsequently, in phase 440 the UEs transmit on the PUSCH, in accordance with their respective allocations. The transmissions of phase 440 may take place with a reduced pilot or reference signal use, or without use of pilot or reference signals. The reception of these signals in phase 440 in base station 120 takes place in a data-aided manner, facilitated by all UEs transmitting in each resource block to provide data symbols suitably distributed in frequency domain to observe changes in radio channel conditions between base station 120 and each one of the UEs 110A, 110B, 110C and 110D. In particular, a wide bandwidth with only small gaps between scheduled subcarriers may be obtained. The number of pilot or reference signals may be reduced compared to a situation where entire RBs are allocated to individual UEs.

FIG. 5 is a flow graph of a method in accordance with at least some embodiments of the present invention. The phases of the illustrated method may be performed in user equipment 110A-110D, or in a control device configured to control the functioning thereof, when installed therein.

Phase 510 comprises transmitting, from an apparatus, using orthogonal frequency-division multiplexing, on a physical uplink shared channel in a system comprising resource block groups, each resource block group comprising two or more resource blocks, each resource block comprising plural subcarriers which are consecutive to each other in frequency. Phase 520 comprises processing an allocation of resources for the physical shared uplink channel, the allocation received from a network, the allocation defining that the apparatus may use a part of, but not all, subcarriers of one or more resource blocks for transmission on the physical shared uplink channel. In case the allocation relates to the more than one resource block, it defines that the apparatus may use the part of, but not all, subcarriers in each one of the more than one resource block.

While discussed herein primarily in terms of transmission in the uplink direction from the UE, the disclosed resource allocation method may also be used in the downlink direction, from the base station to the UE, or directly from a UE to another UE such that radio energy transmitted from a UE is received in a receiver of the other UE, which is known as the sidelink direction. When used in downlink, the base station may provide the allocation to the UEs sharing the shared downlink channel, to enable each UE to correctly receive its data. Likewise, the base station may allocate resources for use in the sidelink.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communication.

REFERENCES

[1] M. Honkala, D. Korpi and J. M. J. Huttunen. DeepRx: Fully Convolutional Deep Learning Receiver. IEEE Transactions on Wireless Communications, 20(6):3925-3940, 2021. DOI: 10.1109/TWC.2021.3054520. Pre-print available in arXiv:2005.01494.

[2] D. Korpi, M. Honkala, J. M. J. Huttunen and V. Starck. DeepRx MIMO: Convolutional MIMO Detection with Learned Multiplicative Transformations. IEEE International Conference on Communications (ICC), 14-23 Jun. 2021. DOI: 10.1109/ICC42927.2021.9500518. Pre-print available in arXiv:2010.16283.

ACRONYMS LIST

ML machine learning
OFDM orthogonal frequency-division multiplexing
PUSCH physical uplink shared channel
RB resource block
RBG resource block group
SRS sounding reference signals

REFERENCE SIGNS LIST

| | |
|---|---|
| 110A-110D | user equipments |
| 120 | base station |
| 130 | core network node |
| 140 | gateway |
| 150 | subcarriers |
| 160 | resource block |
| 170 | resource element |
| 300-370 | structure of the device of FIG. 3 |
| 410-440 | phases of signalling of FIG. 4 |
| 510-520 | phases of the method of FIG. 5 |

What is claimed is:

1. An apparatus comprising:

at least one processing core; and at least one memory storing instructions that, when executed by the at least one processing core, cause the apparatus at least to:

transmit, in an uplink direction using orthogonal frequency-division multiplexing (OFDM), via a physical uplink shared channel (PUSCH) in a system comprising resource block groups, each resource block group comprising a plurality of resource blocks, each resource block of the plurality of resource blocks comprising a plurality of subcarriers distributed across a frequency domain and a plurality of OFDM symbols distributed along a time domain, the plurality of subcarriers being consecutive to each other in frequency;

process a resource allocation message received from a base station, the resource allocation message comprising parameters including a resource block start index, a number of consecutive resource blocks, an offset value, a period value, and a time-hop value, wherein the resource allocation message further includes:

an indication of the time-hop value defining a number of subcarriers by which the subcarriers allocated to the apparatus are shifted from one orthogonal frequency-division multiplexing symbol to the next;

an indication of how many consecutive subcarrier offsets, beginning from a primary offset, that are allocated to the apparatus; and an indication of a periodicity within the plurality of resource blocks, the periodicity defining which proportion of the subcarriers of the plurality of resource blocks are allocated to the apparatus;

determine, based on the parameters, a subset of subcarriers within each of the one or more resource blocks that correspond to the offset value and the period value;

map data symbols for transmission onto only the determined subset of subcarriers, wherein the mapping comprises interleaving the data symbols of the apparatus across the frequency domain according to the period value and the offset value;

select, based on the resource allocation message, a portion of the plurality of OFDM symbols of a slot corresponding to the time domain, the selected portion defining OFDM symbols of the plurality of OFDM symbols during which the apparatus is scheduled to transmit; and transmit, based on the resource allocation message, the mapped data symbols within the selected portion of OFDM symbols on the determined subset of subcarriers without transmitting pilot symbols and reference symbols, to facilitate data-aided channel detection by the base station.

2. The apparatus according to claim 1, wherein the system is a fifth generation cellular communication system, wherein each resource block comprises twelve subcarriers.

3. A method executed by a user equipment, the method comprising:

transmitting, in an uplink direction using orthogonal frequency-division multiplexing (OFDM), via a physical uplink shared channel (PUSCH) in a system comprising resource block groups, each resource block group comprising a plurality of resource blocks, each resource block of the plurality of resource blocks comprising a plurality of subcarriers, the plurality of subcarriers being consecutive to each other in frequency;

processing a resource allocation message received from a base station, the resource allocation message comprising parameters including a resource block start index, a number of consecutive resource blocks, an offset value, a period value, and a time-hop value, wherein the resource allocation message further includes:

an indication of the time-hop parameter defining a number of subcarriers by which the subcarriers allocated to the apparatus are shifted from one orthogonal frequency-division multiplexing symbol to the next;

an indication of how many consecutive subcarrier offsets, beginning from a primary offset, that are allocated to the apparatus; and an indication of a periodicity within the plurality of resource blocks, the periodicity defining which proportion of the subcarriers of the plurality of resource blocks are allocated to the apparatus;

determining, based on the parameters, a subset of subcarriers within each of the one or more resource blocks that correspond to the offset value and the period value;

mapping data symbols for transmission onto only the determined subset of subcarriers, wherein the mapping comprises interleaving the data symbols of the apparatus across the frequency domain according to the period value and the offset value;

selecting, based on the resource allocation message, a portion of the plurality of OFDM symbols of a slot corresponding to the time domain, the selected portion defining OFDM symbols of the plurality of OFDM symbols during which the apparatus is scheduled to transmit; and transmitting, based on the resource allocation message, the mapped data symbols within the selected portion of OFDM symbols on the determined subset of subcarriers without transmitting pilot symbols and reference symbols, to facilitate data-aided channel detection by the base station.

4. The method according to claim 3, wherein the system is a fifth generation cellular communication system, wherein each resource block comprises twelve subcarriers.

\* \* \* \* \*